Sept. 24, 1957 E. FERMI ET AL 2,807,581
NEUTRONIC REACTOR
Filed Oct. 11, 1945 6 Sheets-Sheet 2

Witnesses:

Inventors:
Enrico Fermi
Leo Szilard
By:
Attorney

United States Patent Office 2,807,581
Patented Sept. 24, 1957

2,807,581

NEUTRONIC REACTOR

Enrico Fermi, Santa Fe, N. Mex., and Leo Szilard, Chicago, Ill., assignors to the United States of America as represented by the United States Atomic Energy Commission Application October 11, 1945, Serial No. 621,838

2 Claims. (Cl. 204—193.2)

The present invention relates to the general subject of nuclear fission and particularly to the establishment of self-sustaining neutron chain fission reactions in systems embodying uranium having a natural isotopic content.

This application is a continuation in part of our co-pending application Serial Number 568,904 filed December 19, 1944, now matured into U. S. Patent 2,708,656, issued on May 17, 1955.

When it became known that the isotope $U^{235}$ in natural uranium could be split or fissioned by bombardment with thermal neutrons, i. e., neutrons at or near thermal equilibrium with the surrounding medium, many predictions were made as to the possibility of obtaining a self-sustaining chain reacting system operating at high neutron densities. In such a system, the fission neutrons produced give rise to new fission neutrons in sufficiently large numbers to overcome the neutron losses in the system. Since the result of the fission of the uranium nucleus is the production of two lighter elements with great kinetic energy, plus approximately 2 fast neutrons on the average for each fission along with beta and gamma radiation, a large amount of power could be made available if a self-sustaining system could be built.

In order to attain such a self-sustaining chain reaction in a system of practical size, the ratio of the number of neutrons produced in one generation by the fissions, to the original number of neutrons initiating the fissions, must be known to be greater than unity after all neutron losses are deducted, and this ratio is, of course, dependent upon the values of the pertinent constants.

In the co-pending application of Enrico Fermi, Serial Number 534,129, filed May 4, 1944, and entitled "Nuclear Chain Reacting Systems," now Patent No. 2,780,595, dated February 5, 1957, there is described and claimed a means and method of determining the neutron reproduction ratio for any type of uranium containing structure, directly as a result of a simple measurement which can be performed with precision. Accurate values for all of the pertinent nuclear constants need not be known.

In a self-sustaining chain reaction of uranium with slow neutrons, as presently understood, $92^{238}$ is converted by neutron capture to the isotope $92^{239}$. The latter is converted by beta decay to $93^{239}$ and then to $94^{239}$, also by beta decay. Other isotopes of 93 and 94 may be formed in small quantities. By slow or thermal neutron capture, $92^{235}$ on the other hand, can undergo nuclear fission to release energy appearing as heat, gamma and beta radiation together with the formation of fission fragments appearing as radioactive isotopes of elements of lower mass numbers, and with the release of secondary neutrons.

The secondary neutrons thus produced by the fissioning of the $92^{235}$ nuclei have a high average energy, and must be slowed down to thermal energies in order to be in condition to cause slow neutron fission in other $92^{235}$ nuclei. This slowing down, or moderation of the neutron energy, is accomplished by passing the neutrons through a material where the neutrons are slowed by collision.

Such a material is known as a moderator. While some of the secondary neutrons are absorbed by the uranium isotope $92^{238}$ leading to the production of element 94, and by other materials such as the moderator, enough neutrons can remain to sustain the chain reaction, when proper conditions are maintained.

Under these proper conditions, the chain reaction will supply not only the neutrons necessary for maintaining the neutronic reaction, but also will supply the neutrons for capture by the isotope $92^{238}$ leading to the production of 94, and excess neutrons for use as desired.

As 94 is a transuranic element, it can be separated from the unconverted uranium by chemical methods, and as it is fissionable by slow neutrons in a manner similar to the isotope $92^{235}$, it is valuable, for example, for enriching natural uranium for use in other chain reacting systems of smaller overall size. The fission fragments are also valuable as sources of radioactivity.

An initial number of fast neutrons in the system by going through the process of absorption and fission produce in the next generation a number of neutrons generally different from the initial number. The ratio of the number produced after one generation to the initial number for a system of infinite size is called the reproduction or multiplication factor of the system and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus, when K is referred to herein as a constant of a system of practical size, it always refers to what would exist in the same type of system of infinite size. If K can be made sufficiently greater than unity to indicate a net gain in neutrons in the theoretical system of infinite size, and an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption by localized neutron absorbers, and the reproduction ratio must still be sufficiently greater than unity to permit the neutron density to rise exponentially with time in the system as built.

Progressive empirical enlargement of any proposed system for which the factor K is not accurately known in an attempt to attain the overall size of a structure of finite size above which the rate of loss of neutrons by diffusion through the periphery of the structure is less than the rate of production of neutrons in the system leads only to an expensive gamble with no assurance of success. The fact that K is greater than unity and the fact that the critical size is within practical limits must be known rather accurately in advance, as otherwise a proposed structure having a K factor less than unity, or even a K factor greater than but close to unity, might not sustain a chain reaction even if all of the uranium in the world were included.

The earliest attempts to predict a structure capable of sustaining a chain reaction, using natural uranium, involved the use of fine uranium particles such as uranium oxide powder, dispersed in hydrogen in combined form as the slowing agent. However, these attempts were not successful, and analysis of experiments made has indicated that the neutron losses in such a system when natural uranium is used, will prevent a chain reaction from being sustained, irrespective of the size of the system, due to neutron absorption at resonance, in the $U^{238}$ content of the uranium.

However, as we have pointed out in our above cited application, it is possible by proper physical arrangement of the materials to reduce substantially uranium resonance absorption. By the use of light elements for moderators, fewer collisions are required to slow the neutrons to thermal energies with large increments of energy loss per collision, thus decreasing the probability of a neutron being at a resonance energy as it encounters a uranium atom. During the moderation, however, neutrons are moving through the slowing medium over random paths and distances so that the uranium is not only exposed to thermal neutrons but also to neutrons of energies varying between the energy of fission and thermal energy. Neutrons at uranium resonance energies will, if they enter uranium at these energies, be absorbed on the surface of a uranium body whatever its size, giving rise to surface absorption. Any substantial reduction of overall surface of the same amount of uranium will reduce surface absorption, and any such reduction in surface absorption will release neutrons to enter directly into the chain reaction.

For a given ratio of moderator to uranium, surface resonance absorption losses of neutrons in the uranium can be substantially reduced by a large factor when the uranium is aggregated into spaced substantial masses in the molerator. The uranium may be placed in the system in the form of geometrically spaced uranium masses or bodies of substantial size, preferably either of metal, oxide, carbide, or combinations thereof. The term geometric is used to mean any pattern or arrangement wherein the uranium bodies are distributed in the moderator with at least a roughly uniform spacing and are roughly uniform in size and shape, or are systematic in variations of size, shape or spacing to produce a volume pattern conforming to a generally symmetrical system. If the pattern is a repeating or rather exactly regular one, the structure may be conveniently described as a lattice.

The resonance losses in uranium constitute one of the critical factors in the total losses permissible in a neutronic reactor. Proper sizes and shapes of the uranium bodies and volume ratios of uranium to moderator must be fairly accurately known in order that optimum geometry be approached, or if the used of near-optimum geometry is not desirable, then the permissible ranges of departure from the optimum should be determined, so that a reproduction ratio greater than unity can be maintained in a reactor of practical size.

Neutrons are also subject to capture by the moderator. While carbon and beryllium have very small capture cross sections for thermal neutrons, and deuterium still smaller, a fraction of the thermal neutrons present in the system under best conditions is lost by capture in the moderator during diffusion therethrough. It is therefore desirable to have the neutrons reaching thermal energy enter uranium as promptly as possible. This may be taken car of by using optimum or near optimum geometry where the resonance absorption is substantially equal to absorption in the moderator.

Moderators differ in their ability to slow down neutrons and in their capacity to absorb neutrons. An important criterion of the ability to slow down neutrons is what is known as the scattering cross section of the nucleus. The ability to absorb or capture neutrons is expressed by what is known as the capture cross section of the nucleus. The ratios of absorption cross section to scattering cross section for various moderators are approximately as follows:

| | |
|---|---|
| Light water ($H_2O$) | .00478 |
| Diphenyl | .00453 |
| Beryllium | .00127 |
| Graphite | .000726 |
| Heavy water ($D_2O$) | .00017 |

The choice of moderators, therefore, will depend on many considerations, as will be apparent from further discussions herein.

The parent application cited above has set forth that K factors greater than unity can be obtained by aggregating the uranium in the form of spheres, rods and layers, and has shown the structure, K factor and volume ratio ranges for uranium spheres and rods in various moderators. The present application deals solely with aggregation of the uranium into layers, sometimes called plates or slabs, in various moderators, and K factors and volume ratios for operative neutronic reactors embodying such construction.

While plate or slab geometry is not as efficient in reducing resonance absorption as sphere or rod geometry, due to the fact that the aggregation of the uranium into plates does not reduce the exposed surface as much as the other geometries mentioned, reactors embodying plate geometry have several advantages, especially when the plates are used in liquid moderators. The plates are thin in section for practical K factors, and in consequence can be easily cooled by circulation of the moderator. Furthermore, less jacketing material need be used for protection from the effects of moderator corrosion or to prevent fission product contamination of the moderator or coolant than in the other forms, and in consequence K reduction due to neutron absorption in jacket material is less. Fewer units need be used and handling problems are thus reduced. Therefore, in spite of a somewhat reduced efficiency, plate geometry has a definite place in reactor design.

It is, therefore, an object of the present invention to provide plate geometry neutronic reactors operative to sustain a chain fission reaction with natural uranium disposed in a moderator.

It is a further object of the present invention to set forth the ranges within which operative reactors can be constructed of alternate layers of natural uranium and a neutron moderator.

The objects and advantages of the present invention will be more readily understood from the following description read by reference to the drawings, which show two illustrative forms the present invention may take, as follows.

Figure 1:
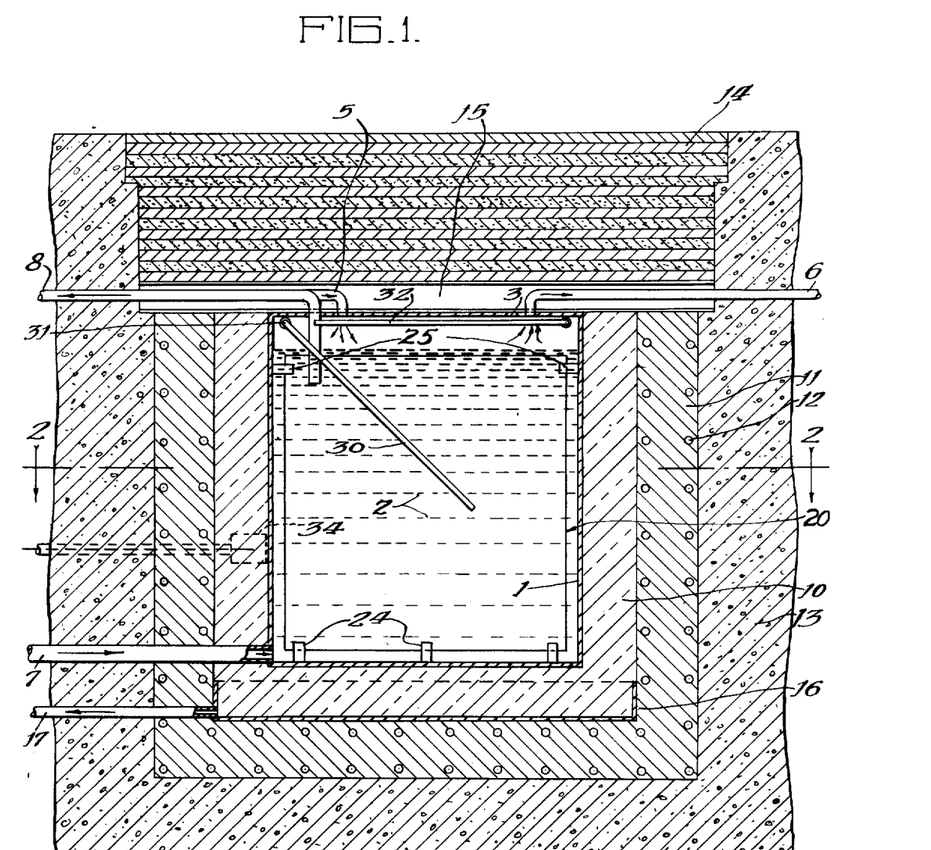
Fig. 1 is a diagrammatic vertical sectional view of the basic structure of a neutronic reactor incorporating spaced uranium plates immersed in a heavy water moderator.

Referring first to Figs. 1 to 4 inclusive, in Fig. 1 a substantially cubical reactor tank 1 is shown preferably of aluminum or thin stainless steel containing a quantity of heavy water as indicated by liquid lines 2. The top of tank 1 is closed by a cover plate 3 forming a space above the heavy water. A helium inlet pipe 5 and a helium outlet pipe 6 enter this space through the cover plate 3 of tank 1. In order that the heavy water may be circulated, a heavy water inlet pipe 7 is provided at the bottom of the tank and a heavy water outlet pipe 8 passes through the cover plate 3 of the tank and extends downwardly into the heavy water.

Figure 2:
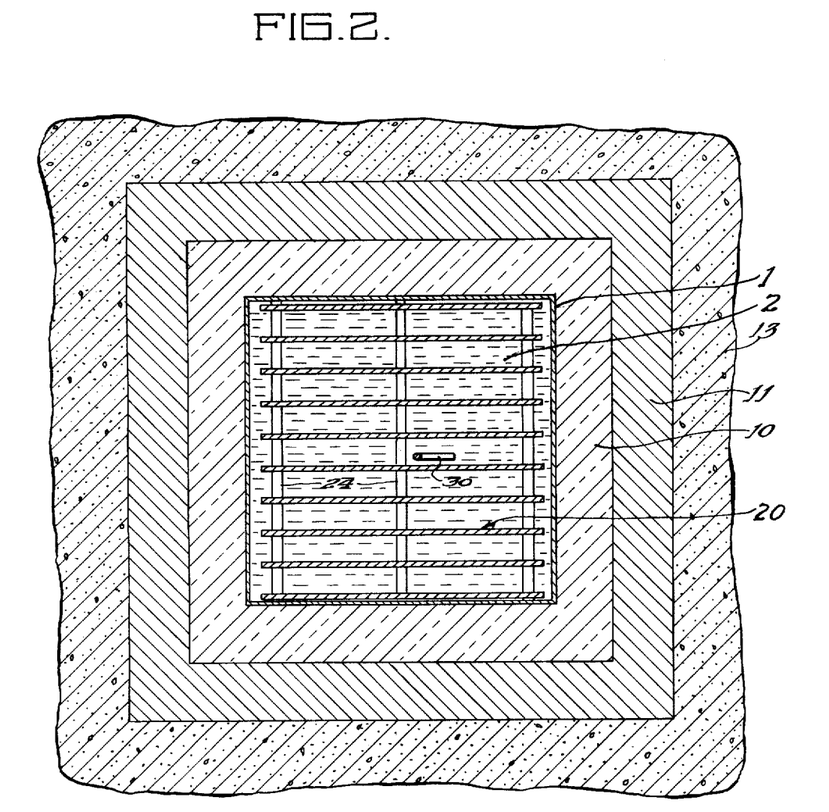
Fig. 2 is a cross-sectional view taken as indicated by the line 2—2 in Fig. 1.

The tank 1 is surrounded on five sides by a graphite reflecting layer 10 preferably built up from machined graphite blocks. This graphite layer is in turn surrounded on five sides by a shielding layer 11 formed from bricks of a cadmium lead alloy and cooled by water pipes 12. This shield is in turn surrounded by thick concrete walls 13, and at the top of the reactor is a stepped back opening to be filled during operation with shielding material 14, supported on beams 15, preferably removable, to complete the shielding around the sixth side of the reactor. In order to conserve heavy water in case of a leak in tank 1, a bottom cup-shaped lining 16 is provided between the graphite reflecting layer 10 and the cadmium shield 11, the lining 16 being drained through drainage pipe 17. Before shield 14 closes the top of the reacting system, fissionable material is inserted in the heavy water consisting in this case of spaced plates or slabs 20 formed from natural uranium. As shown particularly in Figures 1 and 2, the plates or slabs 20, formed of natural uranium, separate and isolate the heavy water or other moderator mass into distinct and individual layers, the width and length of each plate being substantially equal to the width and length of the adjoining moderator layers, each plate 20 having an uninterrupted surface area substantially equal to the cross-sectional area of the active portion of the reactor. A plurality of plates 20 is used to provide definite volume ratios of uranium to heavy water, as will be brought out later. Only a few plates are shown in Fig. 2 for clarity of illustration.

Figure 3:
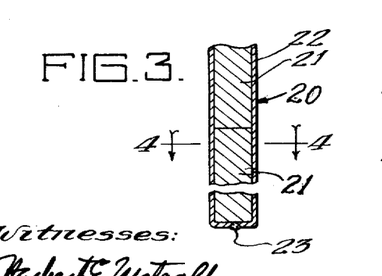
Fig. 3 is a cross-sectional view of a fragment of a uranium plate in a protective jacket.
Figure 4:
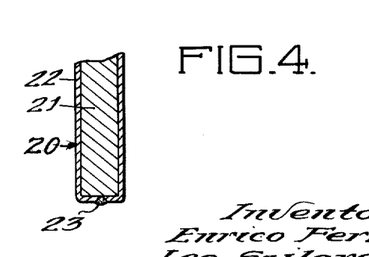
Fig. 4 is a longitudinal sectional view taken as indicated by line 4—4, of Fig. 3.

As it is at present impractical to roll or otherwise form complete sheets of uranium metal several centimeters thick, it is preferred to form each plate from a plurality of strips of uranium 10 to 20 centimeters wide and the full height of the plate, such strips being readily fabricated by rolling extruded uranium rods, for example, into flat strips. These strips 21 are shown in Figs. 3 and 4, and are positioned in edge to edge relationship to form a plate of the width desired and the composite plate thus made is enclosed in a thin aluminum jacket 22 comprising aluminum plates rolled in firm contact with the uranium and secured by turning the edges thereof and welding the aluminum sheets around the entire edge of the plate as indicated by weld 23.

To properly space the uranium plates 20 inside the reactor, spacer bars 24 are provided on the bottom of the reactor notched to receive the plates, and similar spacer bars 25 are positioned near the top of the uranium plates, so that the plates 20 are tied together with the assembly standing erect with the plates in parallel relationship inside the reactor. When the proper volume ratio of uranium to moderator is used with the plates of definite thicknesses and extent, a chain reaction will take place at elevated neutron densities. To remove the heat of the reaction from the reactor, it is preferred that the heavy water be circulated outside the reactor, cooled in heat exchangers not shown, and returned to the reactor.

The reactor is controlled first by the use of a control rod 30 (Fig. 1) which is movable from an upper corner bearing 31 by a shaft extending outwardly through the shields so that a greater or less extent of the rod will enter the heavy water between plates in the reactor. For safety reasons, a second rod 32, which may be termed a safety rod, is normally held horizontally above the level of the heavy water to be released at will to swing into the heavy water between the plates in case a predetermined neutron density is exceeded. The neutron density in the reactor can be monitored in several ways, such as, for example, monitoring the temperature of the outgoing heavy water, or more directly by measuring the neutron density just outside the tank 1 by means of an ionization chamber 34 connected to an indicating device in view of the operator of the reactor. Such ionization chamber will also permit the operator to start and stop the reactor and to reach a desired neutron density level by varying the amount of absorbing material in control rod 30 within the reactor. The size of the reactor is preferably such as to provide a neutron reproduction ratio of unity with the control rod material approximately half-way inserted into the reactor. Under these conditions, insertion of more of the rod into the reactor will stop the reaction while the removal of some of the rod material will permit a reproduction ratio over unity to be obtained so that the neutron density can rise to a desired level and then be held there by moving the control rod back to its position where the reproduction ratio is again unity. Thereafter, small movements of the control rod will permit the chosen neutron density value to be maintained.

Figure 5:
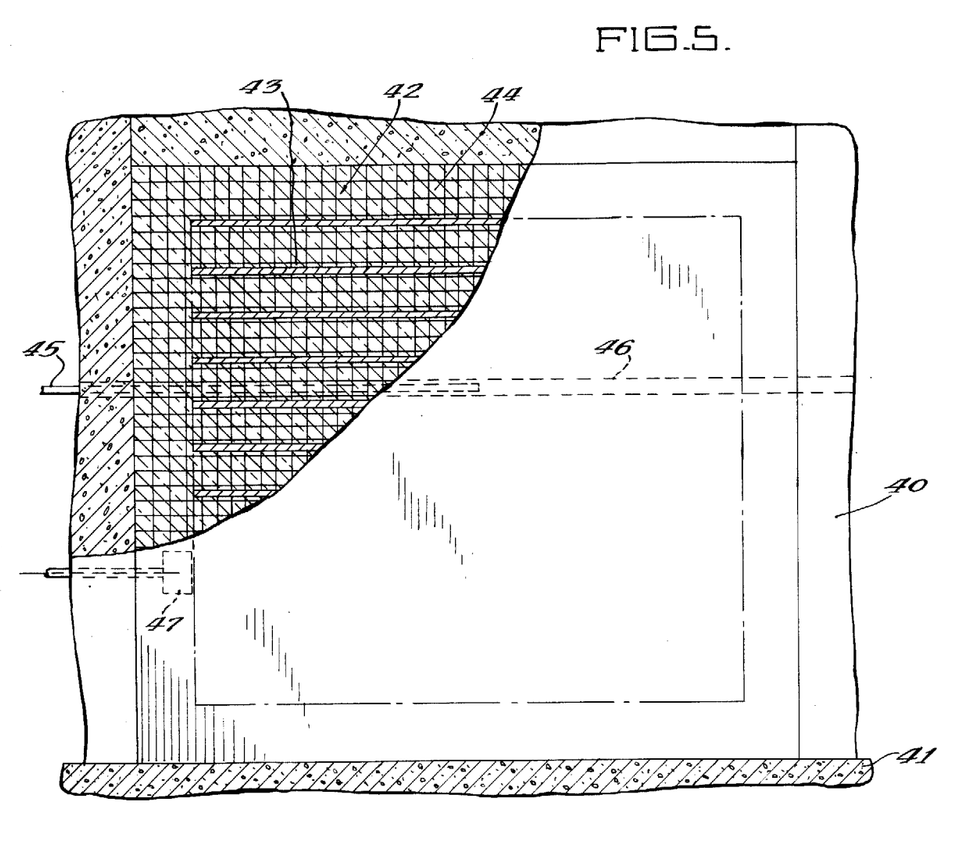
Fig. 5 is a diagrammatic side view, partly in central section, of the basic structure of a neutronic reactor embodying uranium plates disposed in a solid moderator.

Slab or plate geometry for the disposition of uranium in a moderator can also be used with solid moderators, such as, for example, graphite, or graphite and beryllium metal of high purity. In this case, a simple nuclear reactor can be made, for example, as shown diagrammatically in Fig. 5, in which construction the uranium plates need not be jacketed. In Fig. 5, the reactor comprises a heavy concrete shield wall 40 mounted on a concrete base 41 enclosing a cube 42 of solid moderating material preferably formed from machined bricks of graphite or beryllium metal to form a closely packed shield of moderating material. In this moderator cube 42 layers of uranium 43 are horizontally positioned by the bricks and spaced vertically to provide the desired geometry. The uranium layers, however, do not extend entirely to the surface of the moderator cube but terminate on all sides and above and below short of these surfaces to provide a reflecting layer 44 completely enclosing the uranium-bearing portion. In this case, control is by a horizontally movable control rod extendable into and out of the reactor through a slot 46 in the bricks, and the neutron density is monitored by an ionization chamber 47 positioned in the reflector. Control of the reaction in this case is as before by inserting more or less of rod 45 into the reactor. Safety rods, not shown, are also arranged to be pulled into the reactor by gravity upon an excessive rise in neutron density as indicated by the ionization chamber. Full details of the reactor control are given in our co-pending application cited above.

Having discussed several forms for the present invention, what will hereafter be called plate slab geometry as used in these reactors will next be discussed.

In reactors operating continuously at high powers (high neutron densities), radioactive elements of extremely high neutron capture cross section are formed inside the reactor within a few hours, notably the gaseous fission product xenon$^{135}$. The production of xenon$^{135}$ and its destruction by neutron absorption and by decay creates an equilibrium poisoning effect in the reactor determined as to value by the power at which the reactor is to be continuously operated. It can thus be seen that a neutronic reactor can have a satisfactory operating size when operated intermittently and at low power which is entirely too small to support a chain reaction when operated at some elevated power where a noticeable equilibrium amount of xenon$^{135}$ is formed. It is, therefore, necessary, to obtain a continuously operating reactor when a high power is required, to determine the operating sizes required to maintain the desired high power output. Thus, it will be seen there is actually a minimum critical (and operating) size for a neutronic reactor based on operating power, that is larger than the critical size for the reactor if zero power level is not to be substantially exceeded.

However, the reduction in the reproduction ratio due to the xenon$^{135}$ equilibrium amount present when the neutron density is theoretically infinity in the reactor, has been found to be about .03, which means that to obtain a rise in neutron density to any desired density up to infinity, the control rod would have to be eventually removed by an amount corresponding to an increase in the reproduction ratio of about .03, and somewhat less than .03 when finite densities are to be obtained. In accordance with the density desired, the size of the reactor has to be initially big enough to provide the increase. For example, in a continuously operated water cooled uranium graphite reactor, the poisoning effect due to xenon$^{135}$ at equilibrium in terms of the reproduction ratio is about .0012 at 10,000 kilowatts, .009 at 100,000 kilowatts, and about .013 and .020 at 200,000 kilowatts and 500,000 kilowatts, respectively. As before stated, operating sizes ordinarily are not sufficiently large to provide maximum reproduction ratios of over 1.01 with all controls removed. However, if power outputs over 100,000 kilowatts are desired, the reactor must have its critical and operating sizes defined as set forth herein, using final constants decreased by the xenon$^{135}$ factor for the power desired, even though the amount of reduction is over .01. In other words a significant impurity is added during operation at high powers, and must be compensated for by enlargement of the reactor.

This may lead to the requirement for a reactor of such size that, if it did not acquire xenon$^{135}$ during operation, could attain a maximum reproduction ratio of over 1.01 with all control rods removed, and which, before a substantial amount of xenon$^{135}$ is formed, could in consequence attain a dangerous neutron density if controls were entirely removed.

Such a reactor can be adequately safeguarded by the use of "shim" or limiting rods of neutron absorbing material inserted in the reactor preferably to depths that will not permit a reproduction ratio of about 1.01 to be attained at any time during the operation of the reactor, even when the control rod is completely removed. Then, if a reproduction ratio of more than unity cannot be attained by outward movement of the control rod alone, due to the build-up of the xenon$^{135}$ effect, the shim rod can be withdrawn to compensate for the xenon$^{135}$ effect, but still be left in a position where the reproduction ratio cannot exceed 1.01, when the control rod is completely removed.

It can thus be seen that compensation for the xenon$^{135}$ effect is obtained, first by considering the xenon$^{135}$ impurity factor for the power desired, as a reduction in reproduction ratio to determine a proper operating size for a desired power; and second, by initially providing in the reactors, impurities that can be removed by amounts compensating for the xenon$^{135}$ equilibrium amount acquired at a given power output. Clearly then, there are two operating sizes; one, that is able to sustain a chain reaction at low power in absence of any substantial amount of xenon$^{135}$; and two, a larger size able to sustain chain reaction with xenon$^{135}$ present. Both must be known prior to building the reactor.

As $D_2O$ is the best moderator so far known, the range of plate thicknesses and volume ratios for uranium in heavy water will first be discussed with reference to Fig. 6. In this figure, a family of K factor curves is shown as graphs on coordinates where the ordinates represent half thicknesses of the uranium slabs, and the abscissae the ratio of volume of the moderator to uranium volume.

Curves showing the K factors from unity to the optimum are shown, and it will be seen that the maximum K factor of somewhat more than 1.14 is found with a high volume ratio of about 25-1 and a half thickness of about .6 cm. and also at a lower volume ratio of about 7½-1 with a half thickness of about 3.0 cm.

Figure 6:
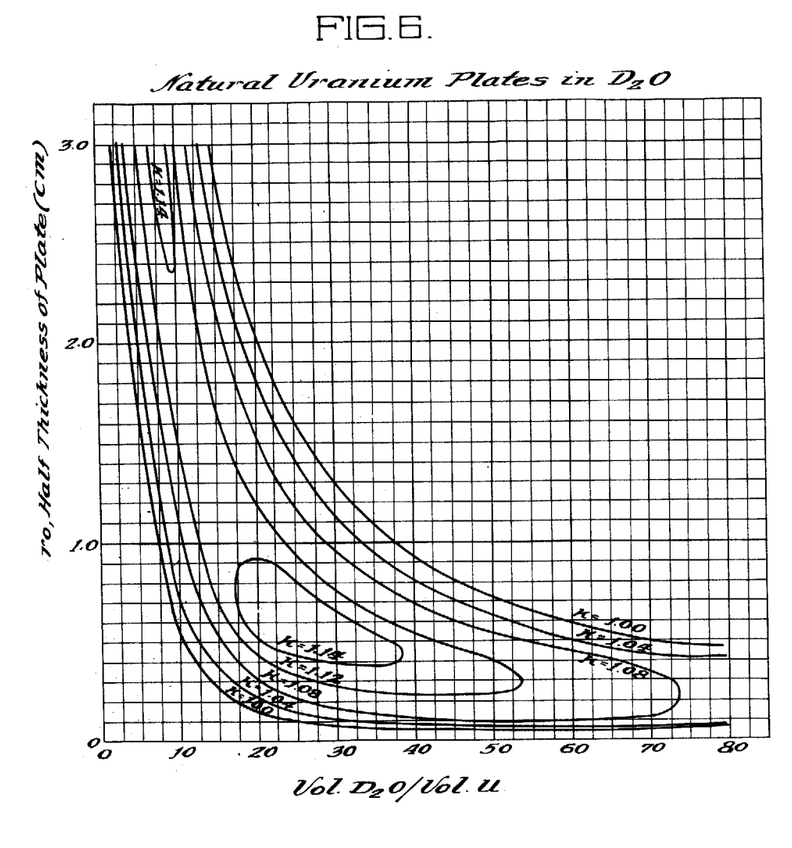
Fig. 6 is a graph or diagram showing K factors for uranium plates in terms of volume ratios of $D_2O$ moderator to uranium and half thickness of uranium plate.

As an example of the use of the curves of Fig. 6, when uranium slabs or plates are to be used as a reactive composition spaced 17 cm. in a $D_2O$ moderator, the volume ratio will be about 43 to 1 with the uranium plates .4 cm. thick. The K factor will be about 1.1 from the curves in Fig. 6. If spaced 33 cm., the plates will be about .76 cm. thick and the K factor will be about 1.13.

Figure 7:
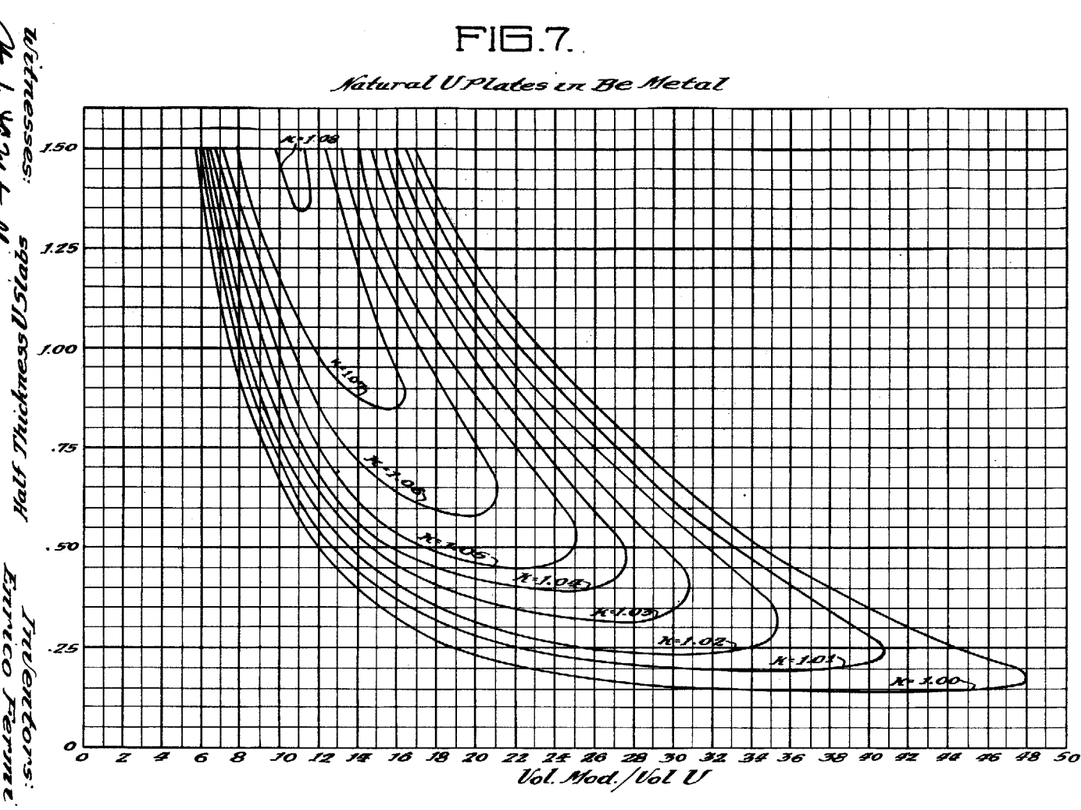
Fig. 7 is a graph or diagram for uranium plates in terms of volume ratios of Be metal moderator to uranium and half thickness of uranium plate.

The reduction of resonance absorption due to the use of slabs is sufficient to permit a chain reaction to be sustained in a reactor of practical size when beryllium metal is used as a moderator, with K factors obtainable for the reactive composition up to slightly over 1.08, as indicated in Fig. 7. In Fig. 7, K curves are plotted as graphs in the same manner as Fig. 6. It will be noted that in this case the K=1 curve is closed at the high volume ratio end, thus clearly indicating uranium units smaller than .15 cm. half thickness will not sustain a chain reaction with any volume ratio or in any size. Thus, a mixture of fine particles of natural uranium and beryllium will not be a reactive composition able to sustain a chain reaction. The reduction in resonance absorption by the use of alternate layers of uranium and beryllium does, however, permit the creation of the desired chain reaction.

Figure 8:
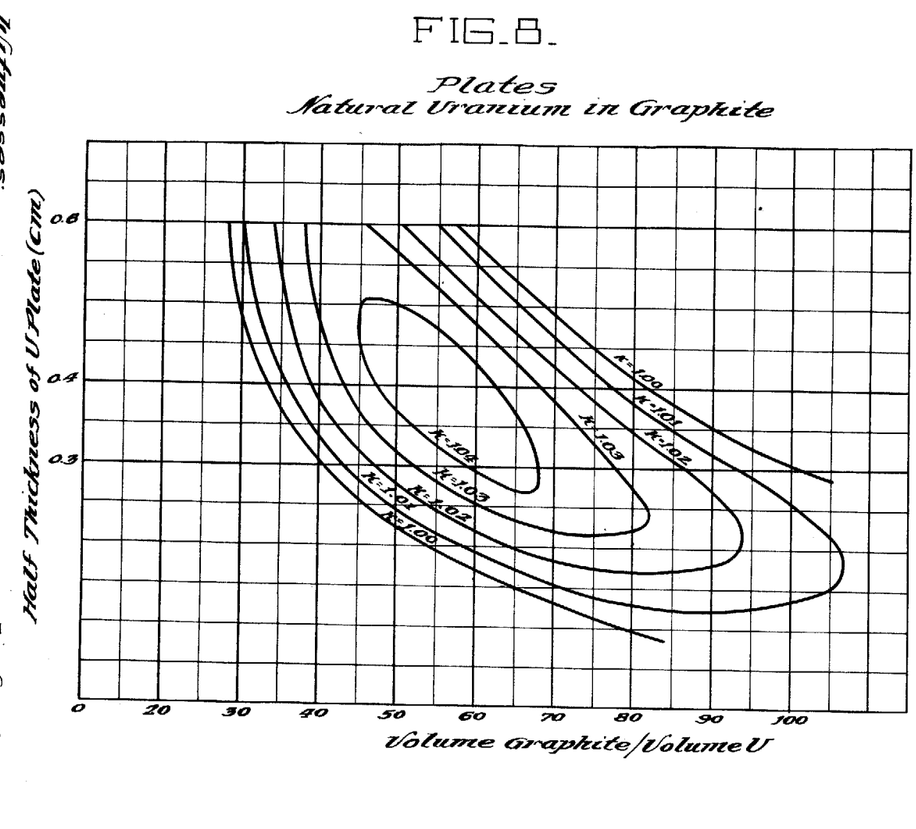
Fig. 8 is a graph or diagram for uranium plates in terms of volume ratios of graphite moderator to uranium and half thickness of uranium plate.

Uranium plates can also be used with a graphite moderator, and K curves for uranium plates in graphite similar to those shown in Figs. 6 and 7, are shown in Fig. 8. Here it will be seen that optimum geometry occurs with a volume ratio of about 55-1 and a half thickness of the uranium plates of about 0.4 cm.

When the K factor is known, operating sizes for various reactive compositions can be found by the use of critical size formulae, modified to include size increase due to absorption in a cooling system, absorption caused by xenon$^{135}$, and excess reproduction ratio desired while operating as follows:

$$K-C-X-r=\frac{M}{R^2}$$

for spherical reactors where R is the radius in cm.

$$K-C-X-r=M\left(\frac{1}{a^2}+\frac{1}{b^2}+\frac{1}{c^2}\right)$$

for a parallelepiped where $a$, $b$, and $c$ are the sides thereof in cm. and $$K-C-X-r=M\left(\frac{1}{H^2}+\frac{0.59}{R^2}\right)$$

for cylinders where H is the height and R is the radius in cm.

In the above formulae:

$K$=Reproduction factor for a reactive compositon of infinite size $C$=Reduction in K due to absorption in coolant tubes, coolant and in jackets to protect uranium from corrosion by the coolant, when any of these items are used inside the reactor $X$=Reduction in reproduction ratio due to xenon$^{135}$ poisoning at desired operating power $r$=Excess of reproduction ratio desired while reactor is operating with xenon$^{135}$ equilibrium established. This amount is usually not greater than 0.005 and may be 0.0005

$M$=a constant embodying the effect of the moderator and slab geometry, as follows:

M for $D_2O \cong 2500$
M for Be metal $\cong 3000$
M for graphite $\cong 6500$

However, reactive compositions by themselves are seldom used in a neutronic reactor because of the cost of materials and because of the fact that operating sizes can be very considerably reduced in size by surrounding the reactive mass with a layer of neutron scattering material to form what is known as a neutron reflector, as shown in Figs. 1–3. All good moderators are good reflectors.

The reduction in size due to the use of a reflecting layer surrounding the reactive mass is given for reflecting layers, which are thin with respect to the extent of the reactive mass, by the formula $$\Delta r^1 \approx L \tanh \frac{\Delta r}{L}$$

where $r^1$ is the reduction in radius of the reactor due to surrounding the reactive mass by a reflecting layer $\Delta r$ thick and where $L$ is the diffusion length for thermal neutrons in the reflecting material.

Using data given above, the reactor shown in Fig. 1, when surrounded on five sides with a 1 ft. reflector of graphite, and when using uranium plates having a thickness of 1.2 cm., a volume ratio of 15 total volume to 1 uranium and 1 mm. aluminum jackets will have an operating size for continuous operation up to 5000 kilowatts, for example, of 12.0 cu. meters for the active portion and will use 12.4 metric tons of $D_2O$ and 15.2 metric tons of uranium. Similarly, a uranium slab-Be metal reactor such as shown and described herein having a 1 ft. Be reflector on all sides, and using uranium slabs 3 cm. thick with a volume ratio of about 10 to 1 will have a volume of 33.7 cu. meters in the active portion and will contain 59.0 metric tons of uranium and 56.6 metric tons of beryllium exclusive of 42.2 metric tons of beryllium in the reflector. This latter reactor, being uncooled, cannot be operated continuously at high power outputs, but reactors of this type can dissipate a few watts continuously, and up to 10,000 kilowatts intermittently for short periods.

When graphite is used as a moderator, in the form of bricks, for example, a neutronic reactor similar to that shown in Fig. 5 can be built. In this case, using optimum geometry as shown in Fig. 7, the K factor will be about 1.05, when uranium layers 0.8 cm. thick are used with a volume ratio of 55–1. The reactor, with a 1 foot graphite reflector, will have a volume of about 258 cu. meters, in the active portion and will contain 87.4 metric tons of uranium and 390 metric tons of graphite inclusive of 115 metric tons of graphite in the reflector.

What is claimed is:

1. A neutronic reactor consisting essentially of plates of natural uranium separating a moderator mass into distinct and individual layers, the width and the length of each plate being substantially equal to the width and length of adjoining moderator layers, and each plate having an uninterrupted surface area substantially equal to the cross-sectional area of the active portion of the reactor, said moderator mass selected from the group consisting of heavy water, beryllium and graphite, the thickness of the uranium plate and the volume ratio of moderator to uranium being within the area encompassed by the branches of the $K=1.00$ curves of Figures 6–8, and the purity of the moderator and the uranium and the total mass thereof being sufficient to sustain a chain reaction.

2. A neutronic reactor in the shape of a rectangular parallelepiped comprising a plurality of plates of natural uranium uniformly disposed in parallel relationship to each other in a moderator of heavy water, said plates separating the moderator into distinct and individual layers, and each plate having an uninterrupted surface area substantially equal to the cross-sectional area of the active portion of the reactor, the width and the length of each plate being substantially equal to the width and length of adjoining moderator layers, tubes communicating with the moderator to provide an inlet and an outlet for movement of the heavy water through the reactor, jackets on said uranium plates to isolate the uranium from the moderator, the volume ratio of moderator to uranium and the thickness of the uranium plate being within the area encompassed by the branches of the $K=1.00$ curve of Figure 6, the excess reproduction ratio, $r$ being between 0.0005 and 0.005, the neutron absorption of the jackets, and the tubes diminishing the K factor by an amount C, the Xenon–135 concentration at the desired operating power diminishing the K factor by the amount X, and the dimensions $a$, $b$ and $c$ of the reactor active portion being given by the equation $$K-C-X-r=M\left(\frac{1}{a^2}+\frac{1}{b^2}+\frac{1}{c^2}\right)$$

where M is a constant embodying the effect of the moderator and slab geometry, and having a value of 2500.

References Cited in the file of this patent
UNITED STATES PATENTS

| | | |
|---|---|---|
| 2,708,656 | Fermi et al. | May 17, 1955 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |

OTHER REFERENCES

Physical Review, Aug. 1, 1939, vol. 56 (1939), pp. 284–286. An article by Anderson, Fermi & Szilard.

Journal de Physique Series 7, 10, pp. 428–429 (1939), by Von Halban, Joliot, Kowarski, Perrin.

H. D. Smyth: "A General Account of the Development of Methods of Using Atomic Energy for Military Purposes," 1940–1945. Supt. of Doc., Washington, D. C., August 1945, pp. 22, 177.

Swain: "Power," July 1940, article titled "Uranium 235—Power Fuel of the Future?" pp. 56–59.

Kelly et al.: Phy. Rev., vol. 73 pp. 1135–9 (1948).

UNITED STATES PATENT OFFICE
Certificate of Correction

Patent No. 2,807,581

Enrico Fermi et al.

September 24, 1957

It is hereby certified that error appears in the printed specification of the above numbered patent requiring correction and that the said Letters Patent should read as corrected below.

Column 8, line 74, for "$r^1$" read $\Delta r^1$;.

Signed and sealed this 27th day of January 1959.

[SEAL]

Attest:
KARL H. AXLINE,
*Attesting Officer.*

ROBERT C. WATSON,
*Commissioner of Patents.*